United States Patent [19]

Hart

[11] Patent Number: 4,761,195
[45] Date of Patent: Aug. 2, 1988

[54] TIRE BUILDING MACHINE SERVER

[75] Inventor: James M. Hart, Akron, Ohio

[73] Assignee: The Goodyear Tire & Rubber Company, Akron, Ohio

[21] Appl. No.: 933,984

[22] Filed: Nov. 24, 1986

[51] Int. Cl.⁴ ............................................. B29H 17/20
[52] U.S. Cl. ................................. 156/116; 156/130.7; 156/406.4; 156/405.1; 156/446
[58] Field of Search ....................... 156/116, 130.7, 123, 156/396, 406.4, 394.1, 405.1, 446, 187

[56] References Cited

U.S. PATENT DOCUMENTS

| | | | |
|---|---|---|---|
| 3,479,238 | 11/1969 | Kehoe et al. | 156/111 |
| 3,852,142 | 12/1974 | Leblond et al. | 156/395 |
| 3,904,471 | 9/1975 | Kubinski | 156/405 |
| 3,989,565 | 11/1976 | Appleby | 156/133 |
| 4,448,627 | 5/1984 | Satoh et al. | 156/405.1 |
| 4,526,647 | 7/1985 | Portalupi et al. | 156/406.4 |

FOREIGN PATENT DOCUMENTS 2108060 5/1983 United Kingdom .

Primary Examiner—David Simmons
Attorney, Agent, or Firm—Frederick K. Lacher; T. P. Lewandowski

[57] ABSTRACT

An apparatus and method especially adapted for applying and cutting a predetermined length of sidewall in strip form on a transfer roll. The strip material is carried by a strip applier assembly which is mounted on a supporting structure for movement of the strip applier assembly toward the transfer roll to carry the strip into position for stitching the end of the strip on the roll so that a predetermined length can be wound on the roll. The strip applier assembly has a primary means for moving the assembly away from the transfer roll to clear a knife assembly which is pivotally mounted on the supporting structure. Tilting of the knife assembly moves an anvil into a cutting position proximate to the strip. The strip applier assembly also has a secondary means for moving the assembly away from the knife before the knife is retracted to prevent smearing of the white sidewall.

12 Claims, 5 Drawing Sheets

TIRE BUILDING MACHINE SERVER

This invention relates, generally, to the cutting and applying of a strip of tire sidewall material to a transfer roll of a tire building machine. Strip component appliers used heretofore have provided cut lengths for application to a drum or transfer roll. Problems have been encountered when cutting a sidewall chafer strip in that the knife blade would retract and pull some of the black cover strip over the white sidewall compound. Other appliers have required special shuttles or shuttle fingers to support the stock all the way to the leading edge for application to the transfer roll or tire building drum. Moving of the anvil to a position proximate to the stock for cutting while at the same time providing space between the anvil and the strip conveyor path has also been a problem. The present invention is directed to an apparatus and method in which the strip is supported until the leading edge is stitched to the transfer roll and the initial portion of the strip is wound on the transfer roll. Then the strip applier assembly is retracted past the knife assembly and the strip is clamped to the strip applier assembly prior to cutting of the strip. After the retraction of the strip applier, the knife assembly is tilted to bring the anvil into a position proximate to the strip and the knife assembly is actuated for moving the knife blade into cutting engagement with the strip and against the anvil. Before retraction of the knife blade, means are then provided for rotating the transfer roll to pull one cut surface away from the blade and other means are provided for moving the strip applier assembly to pull the other cut surface away from the blade and thereby prevent smearing of the white sidewall.

In accordance with one aspect of this invention there is provided apparatus for cutting and applying a strip of flexible material to a cylindrical body comprising a supporting structure, a strip applier assembly mounted on the structure for relative movement toward and away from the cylindrical body, means for stitching an end portion of the strip to the cylindrical body for winding a first predetermined length of the strip on the cylindrical body, clamping means on the applier for clamping the strip to the applier, a knife assembly mounted on the supporting structure at a position for cutting a portion of the strip of flexible material extending between the clamping means and the cylindrical body, the knife assembly having a reciprocating knife blade, and means for moving the applier relative to the supporting structure including primary moving means for moving the applier away from the cylindrical body after the first predetermined length of the strip is wound around the cylindrical body to provide an additional length of the strip for winding on the cylindrical body and secondary moving means for moving the applier further away from the cylindrical body after the strip has been cut and before the knife blade is retracted to prevent smearing of the flexible material at a cut end of the strip.

In accordance with another aspect of the invention there is provided a method of cutting and applying a strip of flexible material to a cylindrical body comprising:

(a) supporting the strip on a strip applier assembly with a tongue portion of the strip adjacent a feeding end of the applier assembly and clamped to the cylindrical body;

(b) rotating the cylindrical body through a predetermined angular distance to wind a predetermined length of the strip around the cylindrical body;

(c) moving the applier assembly away from the cylindrical body a predetermined distance to provide an additional length of the strip for winding around the cylindrical body;

(d) clamping the strip against the applier assembly with a clamp spaced from the cylindrical body;

(e) moving a knife blade into cutting engagement with the strip at a cutting position located between the cylindrical body and the clamp to cut off the strip;

(f) holding the knife blade in the cutting position while the cylindrical body is rotated to wind the remaining portion of the strip on the cylindrical body and while the strip applier assembly is moved an additional distance away from the cylindrical body; and (g) retracting the knife blade from the cutting position.

To acquaint persons skilled in the arts most closely related to the present invention, a certain preferred embodiment thereof illustrating a best mode now contemplated for putting the invention into practice is described herein by and with reference to the annexed drawings forming a part of the specification. The embodiment shown and described herein is illustrative and as will become apparent to those skilled in these arts can be modified in numerous ways within the spirit and scope of the invention defined in the claims hereof.

Figure 1:
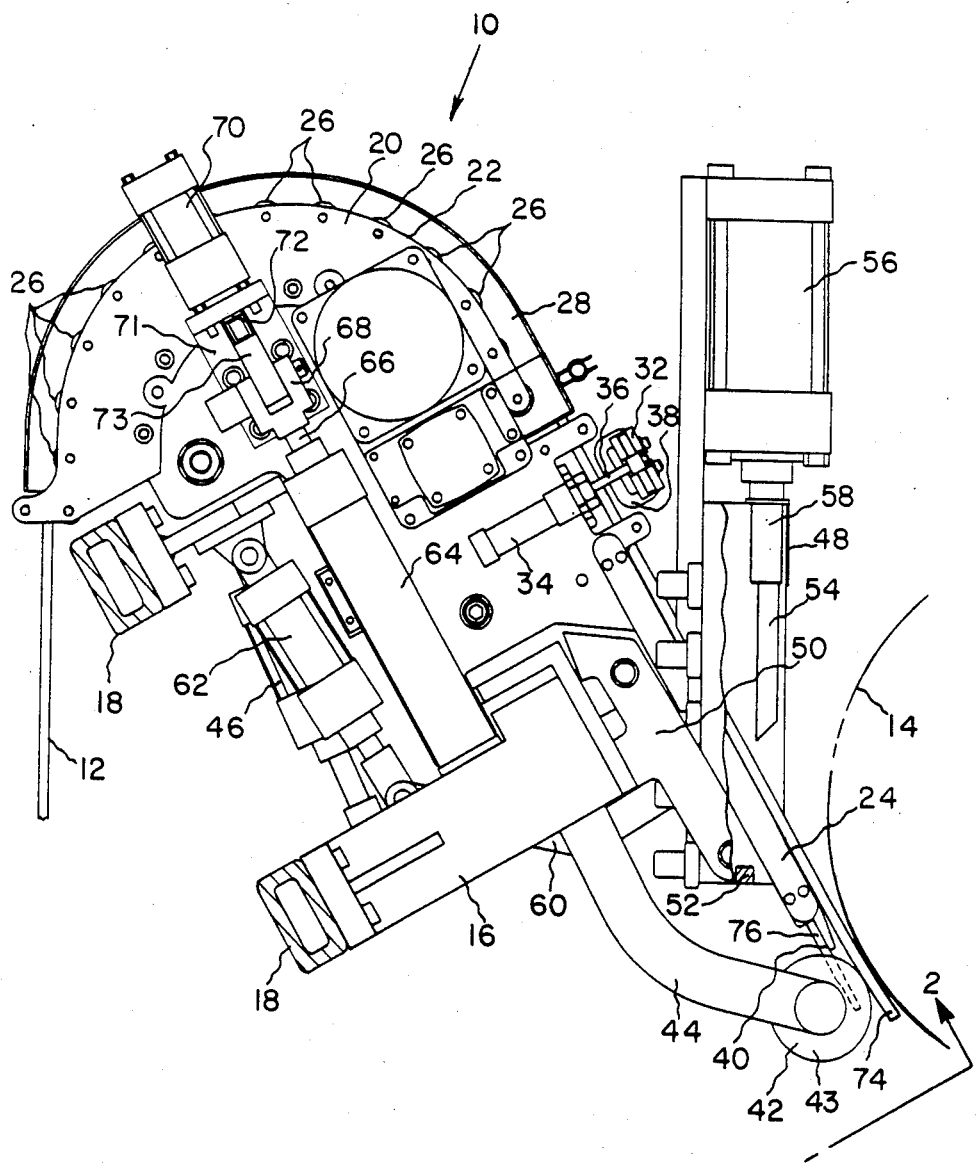
FIG. 1 is a side elevation of a server in accordance with the invention showing part of the tire building machine beams on which it is mounted and the transfer drum in dot-dash lines.
Figure 1:

Referring to FIG. 1, apparatus such as server 10 for cutting and applying a strip of flexible material such as a sidewall chafer 12 in strip form is shown with a cylindrical body such as a transfer roll 14 shown in dot-dash lines in position for receiving the sidewall chafer from the server. The server 10 has a supporting structure such as a frame 16 which may be mounted on beams 18 of a tire building machine. Slidably mounted on the frame 16 is a strip applier assembly 20 which is movable from a retracted position, shown in FIG. 1, to an extended position, shown in FIG. 3. The strip applier assembly 20 includes a strip conveyor having a receiving portion 22 and a feeding portion 24. The receiving portion 22 has a generally curved surface for receiving the sidewall chafer 12 from a roll or other suitable source and supporting it on rollers 26 mounted between side plates 28 which may also have radially extending rollers for engaging the edges of the sidewall chafer 12. Preferably the server 10 is mounted in side-by-side relationship to another server 10' shown in FIG. 2 with similar parts designated with a prime symbol. The servers 10,10' are spaced apart with the innermost of the side plates 28 at a fixed distance such as 4 inches (10.16 cm). The outermost of the side plates 28 of the server 10 may be adjustable, depending upon the width of the sidewall chafer 12. By mounting the outermost of the side plates 28 on adjusting means such as screws (not shown), the position of the side plates may be automatically set for the width of sidewall chafer 12. Suitable controls such as microprocessors and sensors may be utilized to provide this adjustment.

Clamping means such as a clamping bar 32 is positioned between the receiving portion 22 and feeding portion 24 of the strip conveyor. Clamp actuating means such as pneumatic cylinders 34 and piston rods 36 may be mounted on the strip applier assembly 20 and connected to the clamping bar 32 at each end of the bar for retracting and extending the clamping bar from a sidewall chafer gripping position, shown in FIGS. 4 and 5, and a released position, shown in FIGS. 1 and 3. A pad 38 of resilient material such as polyurethane foam may be mounted on the clamping bar 32 so that the bar will conform to the shape of the sidewall chafer 12 which is being clamped.

The feeding portion 24 of the strip conveyor on the strip applier assembly 20 may have supporting rollers (not shown) for supporting and feeding the sidewall chafer 12 with a minimum of surface resistance. Supporting fingers 40 on the feeding portion 24 may also be provided for supporting the leading end of the sidewall chafer 12.

Figure 2:
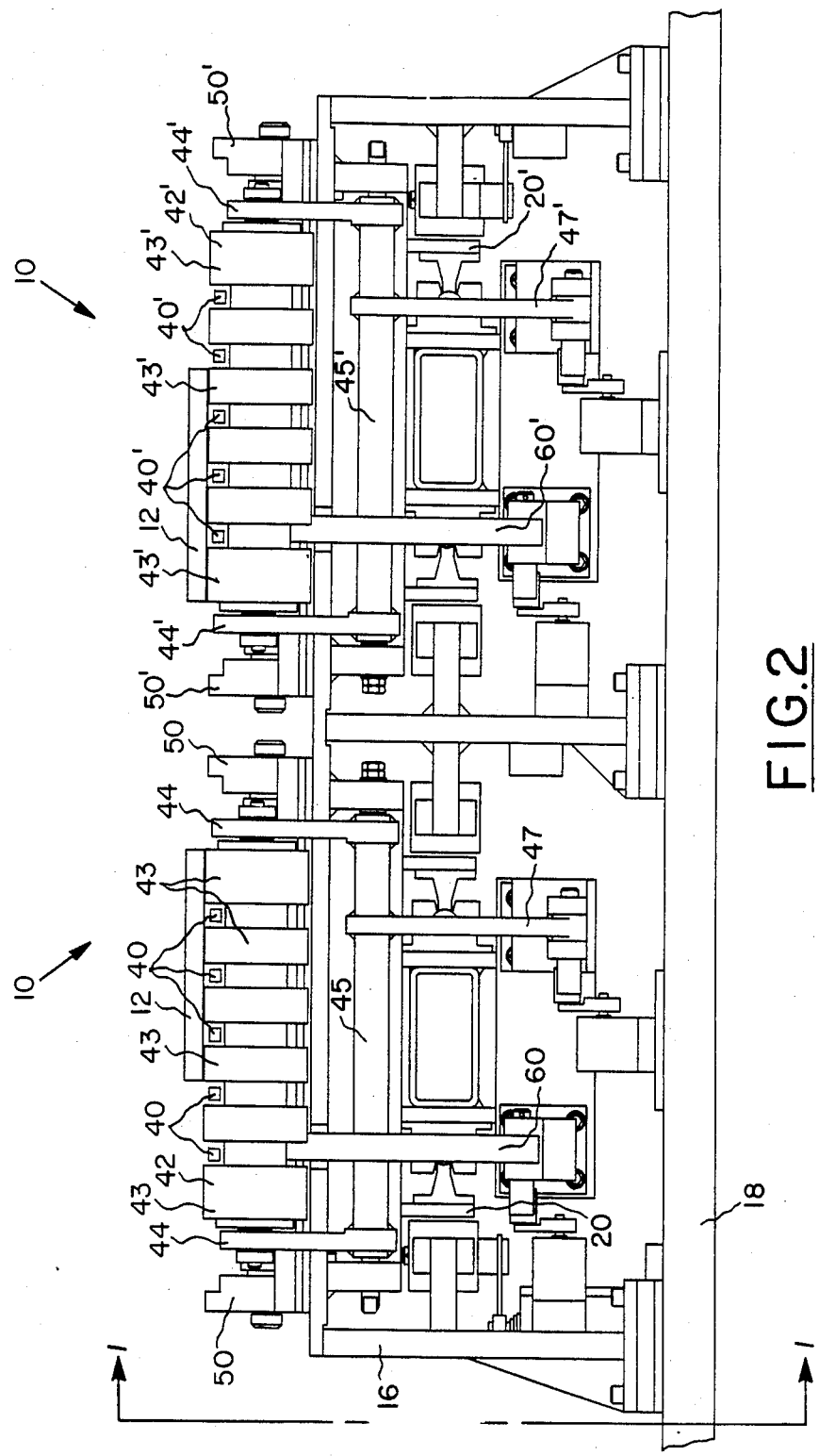
FIG. 2 is an end view taken along line 2—2 in FIG. 1 with the knife assembly omitted and parts being broken away.

As shown in FIGS. 1 and 2, stitching means such as a stitcher roll 42 having spaced discs 43 is supported on crank members 44 mounted on a shaft 45 pivotally supported on the frame 16 and actuated by a piston-cylinder assembly 46 connected to an actuating arm 47 mounted on the shaft. The stitcher roll 42 is movable from a retracted position, such as that shown in FIG. 5, to an extended position, such as that shown in FIGS. 1, 3 and 4, where the sidewall chafer 12 is pressed against the surface of the transfer roll 14. The supporting fingers 40 on the feeding portion 24 of the strip conveyor on the strip applier assembly 20 extend between the spaced discs 43 to permit movement of the discs into pressing engagement with the sidewall chafer 12.

Figure 3:
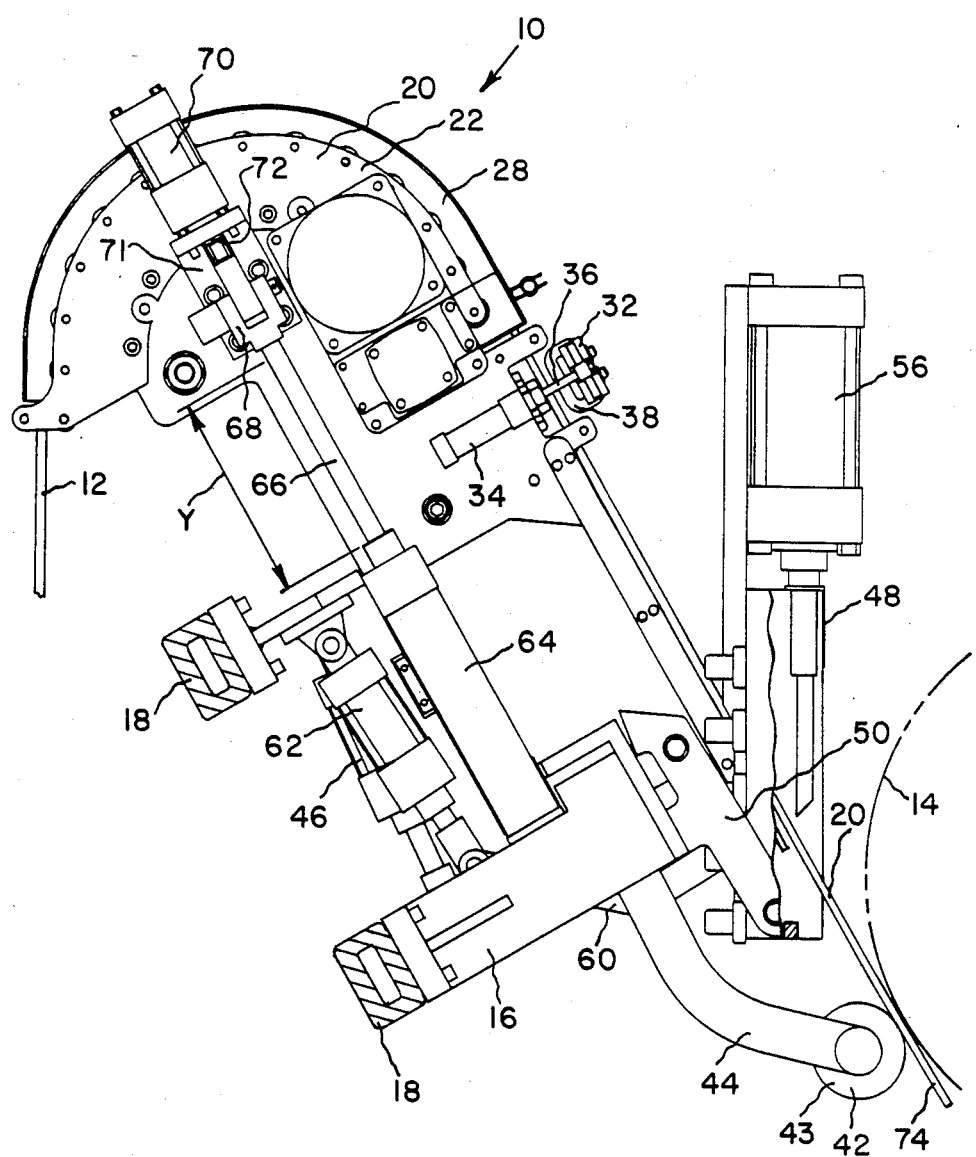
FIG. 3 is a view like FIG. 1 showing the strip applier assembly retracted after wrapping of the initial portion of the sidewall around the transfer roll.
Figure 4:
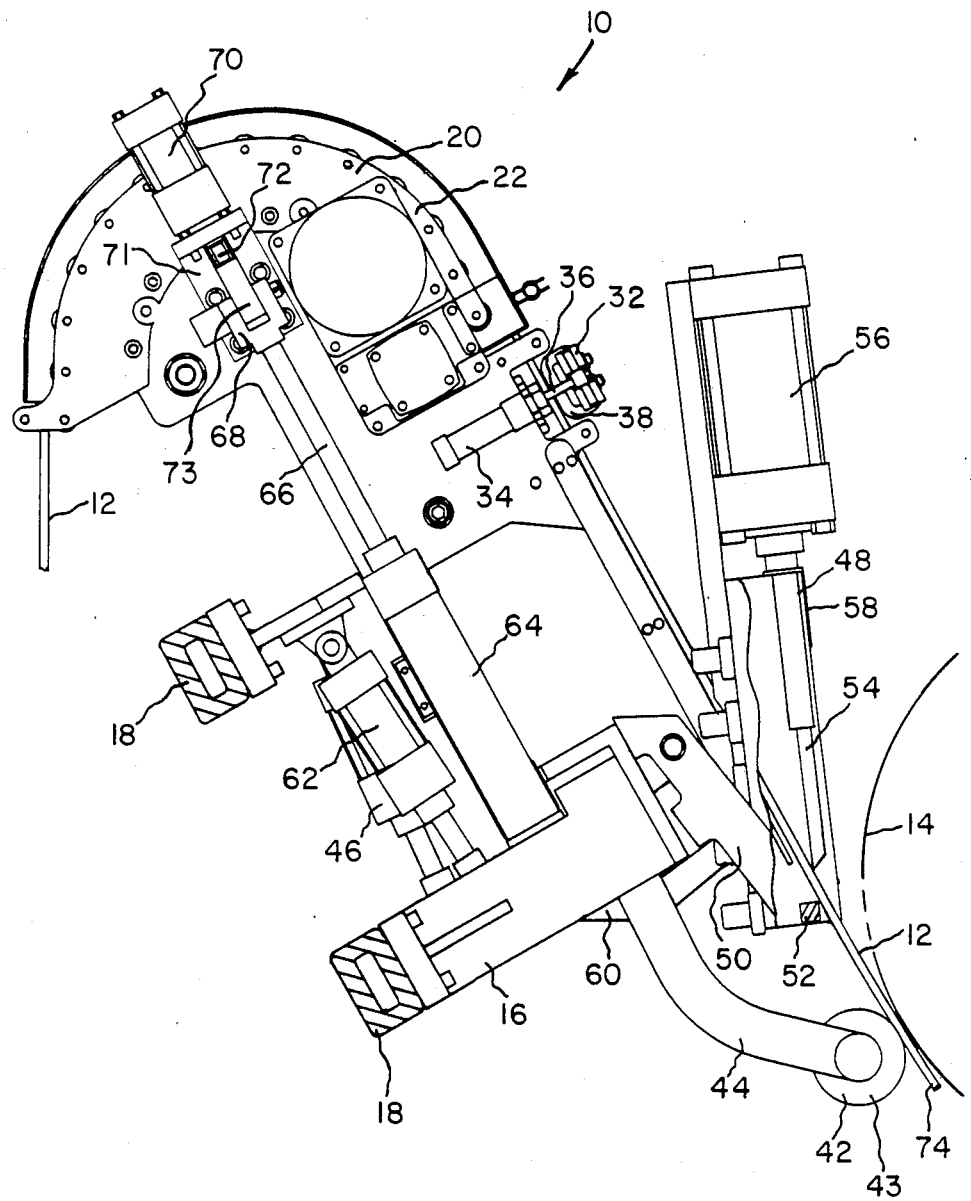
FIG. 4 is a view like FIG. 3 with the stock engaged by the clamp and the knife assembly rotated to raise the anvil under the stock.
Figure 5:
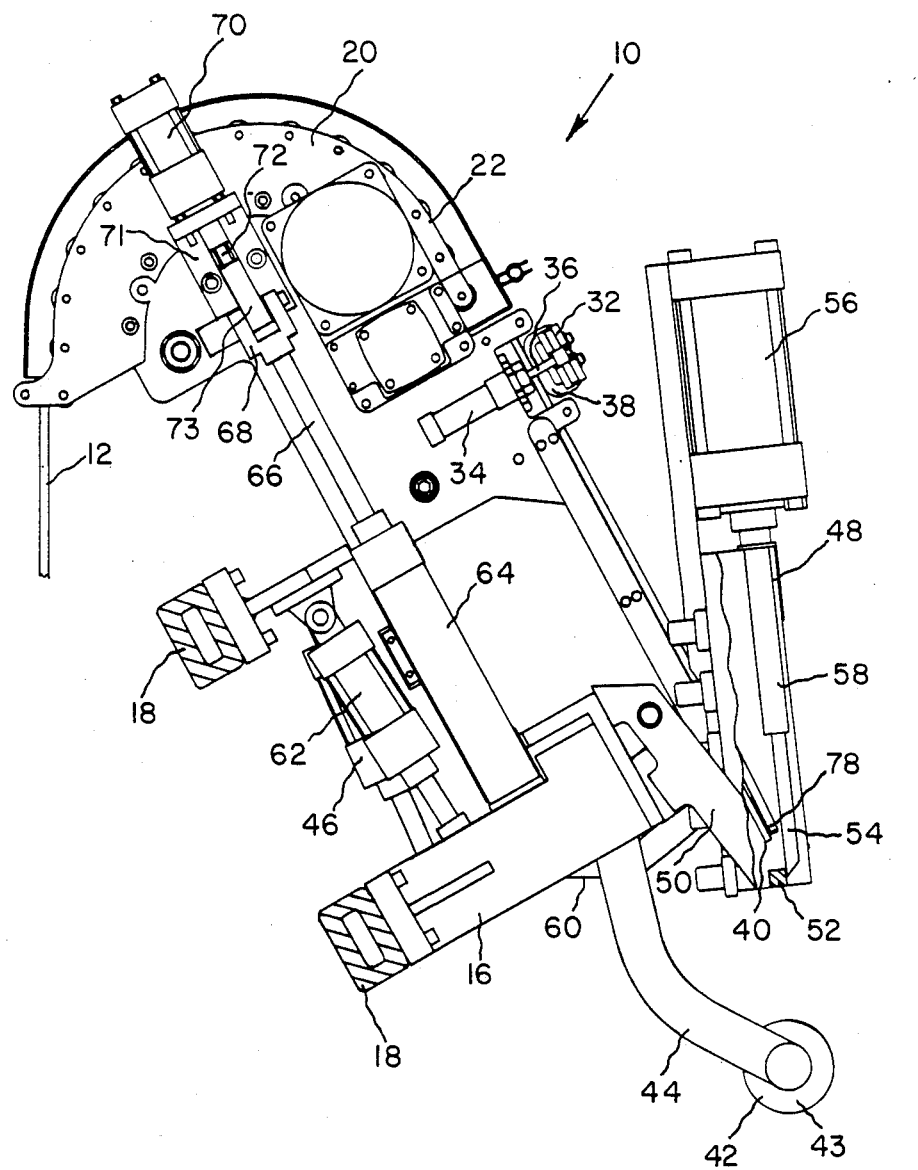
FIG. 5 is a view like FIG. 4 showing the strip applier assembly after it is moved to the left to separate the stock from the knife blade.

A knife assembly 48 is pivotally mounted on rocking members 50 which, in turn, are pivotally mounted on the frame 16 for rocking movement of the rocking members from the position shown in FIG. 1 to the position shown in FIGS. 4 and 5 where the knife assembly is rotated to raise an anvil 52 to a position proximate to the surface of the sidewall chafer 12 so that a reciprocating knife blade 54 may be moved into cutting engagement with the sidewall chafer and against the anvil. The knife assembly 48 may have a pneumatic cylinder 56 with a piston rod 58 connected to the knife blade 54 for moving the knife blade into and out of engagement with the anvil 52. Means for tilting the knife assembly 48 to move the anvil 52 into a position proximate the sidewall chafer 12 includes a lifting lever 60 connected to the knife assembly 48 and to a piston-cylinder assembly 62 which is pivotally mounted on the frame 16. Normally the knife assembly 48 is in the position shown in FIGS. 1 and 3 with the rocking members 50 supported by the frame 16 and the anvil 52 spaced from the sidewall chafer 12. When the sidewall chafer 12 is to be cut, the piston-cylinder assembly 62 is actuated causing the lifting lever 60 to move toward the knife assembly causing it to tilt and rotate the anvil 52 into the cutting position proximate the strip path as shown in FIGS. 4 and 5. Movement of the strip applier assembly 20 from the feeding position shown in FIG. 1 to an extended position for cutting, shown in FIGS. 3 and 4, is provided by a primary moving means such as a cylinder 64 mounted on the frame 16 and having a primary piston rod 66 with a clevis 68. A secondary moving means such as a secondary cylinder 70 is mounted on a bracket 71 bolted to the strip applier 20 and has a secondary piston rod 72 with a rod end 73 connected to the clevis 68. The primary piston rod 66 has a stroke of substantial length which is greater than the relatively short stroke of the secondary piston rod 72. In the preferred embodiment, the primary piston rod 66 has a stroke of about 6.75 inches (17.15 cm) while the secondary piston rod 72 has a stroke of about 0.50 inches (1.27 cm).

In operation, the server 10 shown in FIG. 1 is mounted on the beams 18 at an angle so that the sidewall chafer 12 is held against the feeding portion 24 of the strip conveyor on the strip applier assembly 20 by gravity. Prior to placing the sidewall chafer 12, around the strip applier assembly 20, the outermost of the side plates 28 is adjusted so that the distance between the innermost and outermost side plates corresponds to the width of the sidewall chafer. This can be done by computer control of a servomotor driving the adjusting screw connected to the outermost side plate 28 with the amount of adjustment measured by an encoder connected operatively to the computer. A tongue portion 74 of the sidewall chafer 12 is positioned adjacent a feeding end 76 of the feeding portion 24 of the strip conveyor on the strip applier assembly 20. The tongue portion 74 is then pressed against the surface of the transfer roll 14 by the stitcher roll 42 in response to actuation of the piston-cylinder assembly 46 connected to the actuating arm 47. The transfer roll 14 is then rotated through a predetermined angular distance pulling the sidewall chafer 12 through the applier assembly 20. The primary cylinder 64 is actuated extending the piston rod 66 a predetermined distance Y, as shown in FIG. 3, pulling the strip applied assembly 20 and, specifically, the feeding portion 24 through the knife assembly 48 between the anvil 52 and cutting blade 54 to the position shown in FIG. 3 to provide an additional length of the sidewall chafer 12 for winding around the transfer roll 14. The sidewall chafer 12 is then clamped against the strip applier assembly 20 by the clamping bar 32 which is depressed by the pneumatic cylinders 34 to pull the piston rods 36 toward the strip applier assembly. The knife blade assembly 48 is then tilted by actuating the piston-cylinder assembly 62 causing the lifting lever 60 to move toward the knife assembly and lift the rocking members 50 to the position shown in FIGS. 4 and 5. This tilts the knife assembly 48 in a counterclockwise direction and moves the anvil 52 into a cutting position proximate the sidewall chafer 12. The pneumatic cylinder 56 of the knife assembly 48 is then actuated causing the knife blade 54 to move into cutting engagement with the sidewall chafer 12 and against the anvil 52 to the position shown in FIG. 5. The transfer roll 14 may then be rotated in a counterclockwise direction to wind the remaining portion of the cut strip on the transfer roll to pull the cut end away from the blade 52 while the blade is still in the down position against the anvil 52 as shown in FIG. 5. The transfer roll 14 may then be moved to another position for transferring the cut sidewall chafer 12 to a tire building machine drum. Prior to moving the transfer roll 14, the stitcher roll 42 may be moved away from the transfer roll to a lowered position as shown in FIG. 5 by actuating the piston-cylinder assembly 46.

While the knife blade 54 is still in engagement with the anvil 52, as shown in FIG. 5, the secondary cylinder 70 and the piston rod 72 may be actuated to move the strip applier assembly 20 an additional distance to pull another cut end 78 of the sidewall chafer 12 away from the knife blade 54 so that there will be no smearing of black and white rubber in the sidewall chafer which could happen if the knife blade was retracted and the cut ends were still in contact with the knife blade. After the sidewall chafer 12 has been cut and applied to the transfer roll 14, the knife assembly 48 is tilted in a clockwise direction to the position shown in FIGS. 1 and 3 by actuating the piston-cylinder assembly 62 and permitting the lifting lever 60 to retract and the rocking members 50 to rest on the frame 16. Then the primary piston rod 66 and the secondary piston rod 72 are retracted advancing the sidewall chafer 12 and the feeding portion 24 through the knife assembly 48 between the knife blade 54 and the anvil 52 so that the tongue portion 74 extends into the position shown in FIG. 1 for pressing against the transfer roll 14 when it is moved back into operating position.

While a certain representative embodiment and details have been shown for the purpose of illustrating the invention, it will be apparent to those skilled in the art that various changes and modifications may be made therein without departing from the spirit or scope of the invention.

What is claimed is:

1. Apparatus for cutting and applying a strip of flexible material to a cylindrical body comprising a supporting structure, a strip applier assembly mounted on said structure for relative movement toward and away from said cylindrical body, means for stitching an end portion of said strip to said cylindrical body for winding a first predetermined length of said strip on said cylindrical body, clamping means on said applier for clamping said strip to said applier, a knife assembly mounted on said supporting structure at a position for cutting a portion of said strip of flexible material extending between said clamping means and said cylindrical body, said knife assembly having a reciprocating knife blade, and means for moving said applier relative to said supporting structure including primary moving means for moving said applier away from said cylindrical body after said first predetermined length of said strip is wound around said cylindrical body to provide an additional length of said strip for winding on said cylindrical body and secondary moving means for moving said applier further away from said cylindrical body after said strip has been cut and before said knife blade is retracted to prevent smearing of said flexible material at a cut end of said strip.

2. Apparatus in accordance with claim 1 wherein said strip applier assembly includes a strip conveyor having a feeding portion for supporting said strip between said clamping means and a strip feeding end of said applier assembly, said conveyor being movable with said assembly for carrying said strip from said clamping means along a strip path to said strip feeding end and said knife assembly being positioned on said supporting structure for cutting a portion of said strip carried by said conveyor.

3. Apparatus in accordance with claim 2 wherein said knife assembly includes an anvil positioned on one side of said strip path and said knife blade being positioned on an opposite side of said strip path from said anvil providing a knife anvil window through which said strip may pass and means to move said anvil into a cutting position proximate to said strip path for supporting said strip during cutting movement of said knife blade against said anvil.

4. Apparatus in accordance with claim 3 wherein said knife assembly is pivotally mounted on said supporting structure for tilting of said knife assembly and said means to move said anvil includes means for tilting said knife assembly to move said anvil into said cutting position proximate to said strip path.

5. Apparatus in accordance with claim 2 wherein said strip conveyor includes a receiving portion for supporting said strip as it is received from a supply source, guide members extending along the sides of said feeding portion and said receiving portion of said conveyor, at least one of said guide members being movable toward and away from the other of said guide members to adjust the distance between said guide members to the width of said strip and power means to move said guide member in response to controls set to the width of said strip.

6. Apparatus in accordance with claim 1 wherein said primary moving means and said secondary moving means include a pneumatic power means disposed between said applier assembly and said supporting structure with said primary moving means having a primary piston rod with a stroke of substantial length and said secondary moving means having a secondary piston rod with a relatively short stroke.

7. Apparatus in accordance with claim 6 wherein said pneumatic power means includes a primary cylinder attached to said supporting structure, a secondary cylinder attached to said applier assembly and said primary piston rod being connected to said secondary piston rod at a position between said primary cylinder and said secondary cylinder.

8. A method of cutting and applying a strip of flexible material to a cylindrical body comprising:
   (a) supporting said strip on a strip applier assembly with a tongue portion of said strip adjacent a feeding end of said applier assembly and clamped to said cylindrical body;
   (b) rotating said cylindrical body through a predetermined angular distance to wind a predetermined length of said strip around said cylindrical body;
   (c) moving said applier assembly away from said cylindrical body a predetermined distance to provide an additional length of said strip for winding around said cylindrical body;
   (d) clamping said strip against said applier assembly with a clamp spaced from said cylindrical body;
   (e) moving a knife blade into cutting engagement with said strip at a cutting position located between said cylindrical body and said clamp to cut off said strip;
   (f) holding said knife blade in the cutting position while said cylindrical body is rotated to wind the remaining portion of said strip on said cylindrical body and while said strip applier assembly is moved an additional distance away from said cylindrical body; and
   (g) retracting said knife blade from said cutting position.

9. The method of claim 8 wherein prior to moving said knife blade into cutting engagement with said strip an anvil is moved into a position proximate to said strip at said cutting position so that said knife blade can move said strip into cutting engagement with said anvil.

10. The method of claim 8 wherein said tongue portion is clamped to said cylindrical body by a stitcher roll movable from a position spaced from said cylindrical body to a position pressing said strip against said cylindrical body.

11. The method of claim 9 wherein a knife blade assembly including said knife blade and said anvil is tilted in one direction to move said anvil into a position proximate to said strip and then after retracting said knife blade said knife blade assembly is tilted in another direction to provide space between said anvil and said strip for unimpeded movement of the remaining portions of said strip.

12. A knife assembly for cutting a strip of flexible material supported on a strip conveyor for carrying said strip along a strip path comprising pivotally mounting said knife assembly on a supporting structure for tilting of said knife assembly, a knife blade positioned on one side of said path, an anvil positioned on an opposite side of said path from said knife blade, means for moving said knife blade into and out of strip cutting engagement with said anvil and means for moving said anvil from a position spaced from said strip path to a strip cutting position proximate to said strip path including means for tilting said knife assembly.

* * * * *